United States Patent [19]

Balaban et al.

[11] 4,132,927
[45] Jan. 2, 1979

[54] GATING SIGNAL GENERATOR FOR SWITCHED PINCUSHION CORRECTION CIRCUIT

[75] Inventors: Alvin R. Balaban, Lebanon; Steven A. Steckler, Clark, both of N.J.

[73] Assignee: RCA Corporation, New York, N.Y.

[21] Appl. No.: 841,033

[22] Filed: Oct. 11, 1977

[51] Int. Cl.² .......................................... H01J 29/70
[52] U.S. Cl. ................................ 315/371; 315/408
[58] Field of Search ..................... 315/371, 370, 408

[56] References Cited

U.S. PATENT DOCUMENTS

| 4,064,406 | 12/1977 | Tiemeijer | 315/371 X |
| 4,081,722 | 3/1978 | Haferl | 315/408 X |

Primary Examiner—Maynard R. Wilbur
Assistant Examiner—Richard E. Berger
Attorney, Agent, or Firm—Eugene M. Whitacre; Paul J. Rasmussen; William H. Meise

[57] ABSTRACT

A switched television pincushion correction circuit uses a controllable switch including an SCR gated at the horizontal deflection rate. The gating signal is a horizontal rate pulse which is duration-modulated at the vertical rate. A gating pulse generator includes a source of rectified mutually inverted vertical sawtooth signals. An offsetting circuit generates from the rectified signals two vertical rate signals offset from each other by a fixed amount. The offset signals are summed and the sum signal is used to modulate a horizontal-rate ramp-on-pedestal signal in order to generate the duration modulated SCR gating signal.

13 Claims, 9 Drawing Figures

GATING SIGNAL GENERATOR FOR SWITCHED PINCUSHION CORRECTION CIRCUIT

BACKGROUND OF THE INVENTION

This invention relates to television pincushion correction circuits and in particular to pulse-duration modulation pulse generators useful therein.

A pincushion correction circuit is described in U.S. patent application Ser. No. 722,600, now U.S. Pat. No. 4,088,931, for Peter Edward Haferl and entitled "PINCUSHION CORRECTION CIRCUIT" in which an impedance network is coupled in series with the horizontal deflection coil. The impedance network is paralleled by a controllable switch which is gated into conduction during the horizontal retrace interval. At the top and at the bottom of the vertical scan, corresponding to the beginning and to the end of the vertical scanning interval, the switch is gated on near the last portions of the horizontal retrace interval, thus placing a large average impedance in series with the horizontal deflection winding and reducing the scanning current. Near the center of the vertical scan, the controllable switch is gated into conduction near the center of the horizontal retrace interval, so that the average impedance in series with the horizontal deflection winding is small and the resulting scanning current is comparatively higher.

Gating of the controllable switch in the aforementioned application is controlled by a gating pulse generator synchronized with the horizontal and vertical deflection generators. It is desirable to form the gating pulse generators in a manner suited to integrated circuit (IC) application. In particular, large-value capacitors and extra interface terminals should be avoided. However, suitable circuit controls must be provided.

SUMMARY OF THE INVENTION

A pulse-duration modulated gating signal generator includes a source of vertical rate ramp signals and an inverter coupled to the source for generating an inverted ramp signal. The ramp and inverted ramp signals are coupled to a comparison arrangement in which the one having the larger instantaneous value is selected and coupled to an offset voltage generator with a plurality of outputs. The offset outputs are summed in a signal summing circuit to form a modified vertical rate ramp signal, which is coupled to one input of a comparator. Horizontal-rate retrace pulses are coupled to a ramp-on-pedestal generator to generate horizontal-rate ramp-on-pedestal pulses which are coupled to the other input of the comparator. Pulse-duration modulated signals are taken from the output of the comparator.

DESCRIPTION OF THE INVENTION

Figure 1:
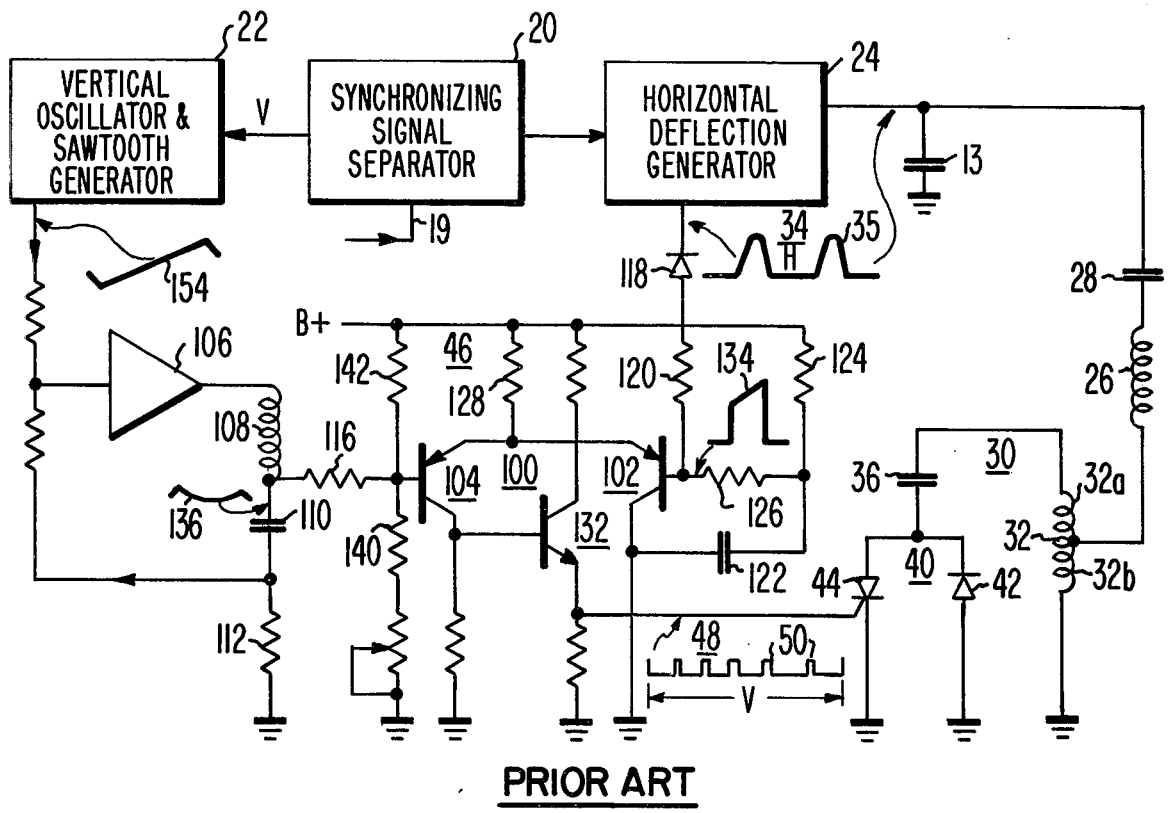
FIG. 1 is a diagram in block and schematic form of a television deflection arrangement with switched pincushion correction in accordance with the prior art.

FIG. 1 is a diagram of a television deflection arrangement similar to that described in the aforementioned U.S. patent application Ser. No. 722,600. In FIG. 1, a synchronizing signal separator 20 receives composite video signals at an input terminal 19 from a video detector, not shown. Separator 20 separates horizontal synchronizing signals from the composite video and applies them to a horizontal deflection generator 24. Horizontal deflection generator 24 uses the horizontal synchronizing signals to synchronize the generation of a sequence 34 of recurrent retrace pulses 35 and horizontal deflection current applied across a retrace capacitor 13 and through an S-shaping capacitor 28 to a horizontal deflection winding 26. Horizontal deflection winding 26 is coupled in series with a portion 32b of an inductor 32 of a pincushion correction circuit designated generally as 30. Pincushion correction circuit 30 includes a controllable switch designated generally as 40 and including an SCR 44 having its cathode coupled to ground and antiparalleled with a diode 42. The end of switch 40 remote from ground is coupled to inductor portion 32b by a capacitor 36 and a portion 32a of inductor 32.

Synchronizing signal separator 20 also separates vertical synchronizing signals from the composite video and applies them to an input terminal of a vertical oscillator and sawtooth generator 22. Generator 22 uses the vertical synchronizing signals to synchronize the generation of a vertical-frequency sawtooth or recurrent ramp voltage illustrated as 154. Ramp signal 154 is applied to an input of a vertical deflection amplifier 106. Amplifier 106 drives a vertical deflection coil 108 coupled in series with an S-shaping capacitor 110 and current sensing resistor 112. Inverse feedback from resistor 112 to amplifier 106 forces a current analog of ramp voltage 154 to flow in deflection coil 108.

The gate of SCR 44 of controllable switch 40 is a repetitive sequence 48 of gating pulses 50 generated by a gating pulse generator designated generally as 46. Generator 46 includes a comparator designated generally as 100 and including transistors 102 and 104 emitter-coupled by a resistor 128. The base of transistor 104 is biased by a voltage divider including resistors 140 and 142. The base of transistor 104 is also coupled by means of a resistor 116 to S-shaping capacitor 110. The base voltage of transistor 104 is varied at the vertical rate by the parabolic voltage illustrated as 136 appearing across capacitor 110. The base of transistor 102 is coupled to a ramp-on-pedestal generator including a diode 118, resistors 120, 124 and 126, and a capacitor 122. The ramp-on-pedestal generator is coupled to the horizontal deflection generator by diode 118 and resistor 120. An output is taken from comparator 100 by an emitter follower designated generally as 132 coupled to the collector of transistor 104. The output is coupled to the gate of SCR 44.

In operation, during the horizontal trace interval horizontal deflection generator 24 applies a negative-going portion of pulse sequence 34 to the cathode of diode 118 and renders it conductive. Conduction of diode 118 through resistors 120 and 126 maintains capacitor 122 in a discharging condition. This in turn maintains transistor 102 conductive and transistor 104 nonconductive, so that the gating signal applied to SCR 44 is zero.

During the horizontal retrace interval, the voltage applied to the cathode of diode 118 becomes positive, and diode 118 turns OFF. This immediately stops the conduction in resistor 126, so the base voltage of transistor 102 rises to form a pedestal. At the same time, capacitor 122 begins to charge through resistor 124, forming a ramp voltage which is superimposed upon the pedestal, as illustrated by waveform 134. At some time during the horizontal retrace interval, the ramp portion achieves a voltage equal to that of the base of transistor 104, and the comparator switches, thereby producing a gating pulse illustrated as 50. At the termination of horizontal retrace, diode 118 is once again turned on and comparator 100 switches to its quiescent condition as capacitor 122 again discharges.

The vertical-rate parabolic voltage coupled to the base of transistor 104 modulates the base voltage at a vertical rate so that the switching time of comparator 100 during the horizontal retrace interval is periodically varied at the vertical rate. At the top and bottom of the vertical scanning interval, the parabolic voltage component at the base of transistor 104 is more positive, so that ramp portion of waveform 134 intersects later, thereby causing later switching of comparator 100. This in turn causes late gating of SCR 44 during each horizontal retrace interval at the top and bottom of vertical scanning interval, and places a higher average impedance in series with deflection winding 26 for reduced scanning and pincushion correction.

Figure 2:
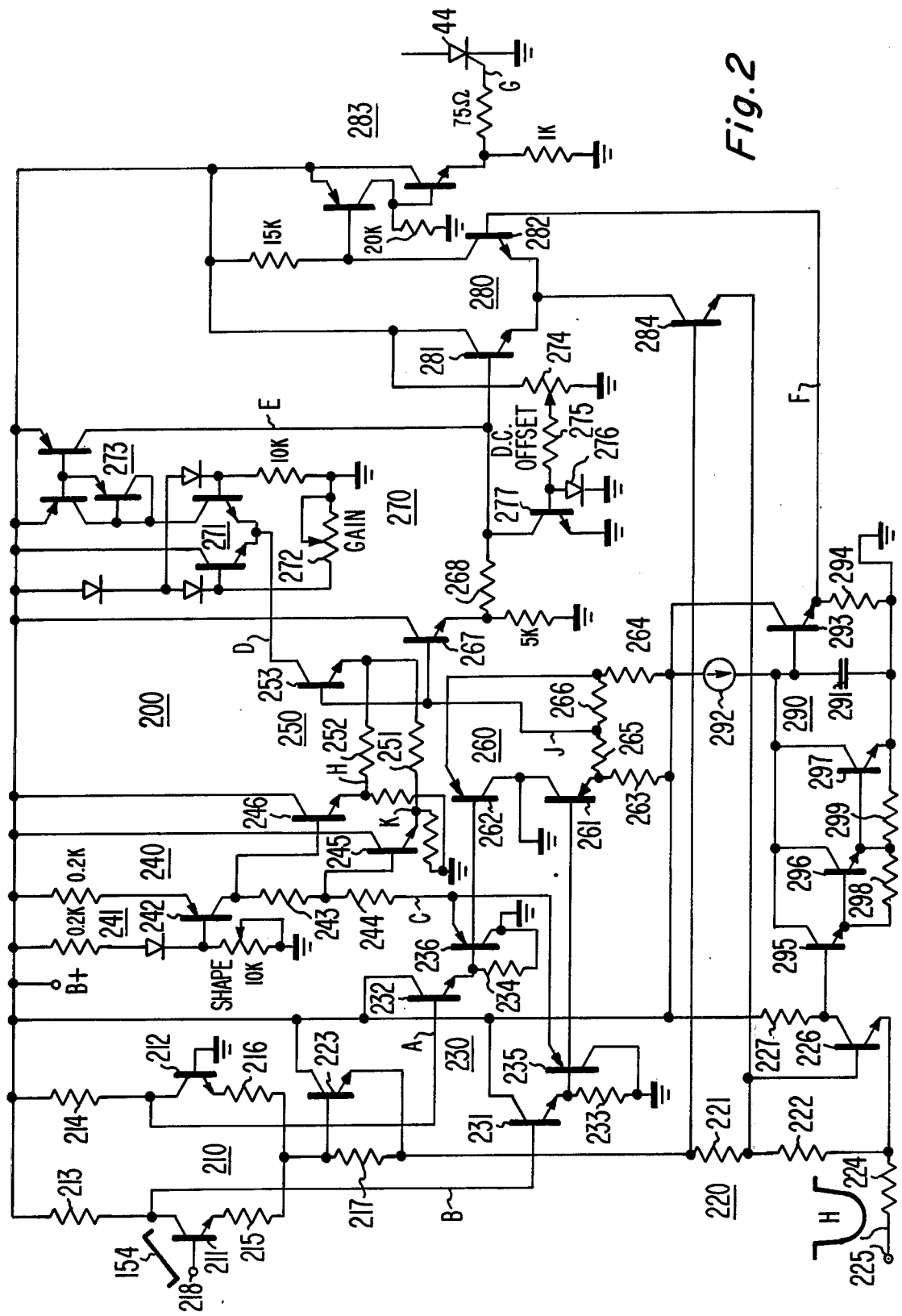
FIG. 2 is a schematic diagram of a gating pulse generator embodying the invention.

FIG. 2 is a schematic diagram of a gating pulse generator designated generally as 200 having inputs which may be coupled to a vertical-frequency sawtooth generator and horizontal deflection generator in place of control circuit 46 of FIG. 1. Generally speaking, FIG. 2 includes at the left a differential amplifier 210 driven at the base with a vertical-frequency signal and at the emitter with a horizontal-frequency signal from a circuit 220. Push-pull outputs are taken over conductors A and B from amplifier 210 and applied to a rectifier circuit 230. The output of the rectifier circuit is coupled by an offset circuit 240 to a summing circuit designated as 250 near the center of FIG. 2. The summing circuit is coupled to an input of a comparator 280 at the right, which also receives an input from a ramp-on-pedestal circuit 290 at bottom center. An output is taken from comparator 280 and applied to the gate of pincushion control SCR 44 at far right.

Differential amplifier 210 includes transistors 211 and 212 emitter-coupled by gain control resistors 215 and 216. The collectors of transistors 211 and 212 are connected to B+ by resistors 213 and 214, and energized by the source of operating potential B+. The base of transistor 212 is grounded and the base of transistor 211 is coupled at a terminal 218 to a source of vertical ramp signals such as sawtooth generator 22 of FIG. 1. Operating current for the emitters of transistors 211 and 212 is supplied through a regulated current source including resistors 217, 221 and 222. Resistor 217 is paralleled by the base-emitter junction of a transistor 223, which maintains the voltage across the resistor at VBE. The collector of transistor 223 is coupled to B+. The emitter of transistor 226 is coupled by a resistor 224 to a terminal 225 which is coupled to a source of negative-going horizontal retrace pulses. During each horizontal retrace interval, differential amplifier 210 receives operating current from transistor 223 and produces a replica of ramp voltage 154 modulated or chopped at the horizontal rate on conductor A, as illustrated by waveform 300 in FIG. 3a. An inverted chopped version of the vertical-frequency ramp is taken from the collector of transistor 211 on conductor B, as shown by waveforms 310 in FIG. 3b.

Conductor A is coupled to the base of an emitter follower transistor 232, and chopped noninverted ramp 300 appears across resistor 234. Conductor B is coupled to the base of an emitter follower transistor 231 and chopped inverted ramp 310 appears across a resistor 233. A rectifier transistor 236 has its base connected to the emitter of transistor 232 and its collector grounded. A rectifier transistor 235 has its base connected to the emitter of transistor 231, its collector grounded and its emitter coupled to the emitter of rectifier transistor 236 at conductor C. The emitter of transistor 231 is also coupled to the base of an emitter follower transistor 261, the collector of which is grounded. The emitter of transistor 232 is also coupled to the base of an emitter follower connected transistor 262, the collector of which is grounded. The emitters of transistors 261 and 262 are supplied with operating current from B+ by resistors 263 and 264, respectively. The emitters of transistors 261 and 262 are coupled together by serially connected resistors 265 and 266, and a center-voltage output is taken on conductor J at the junction therebetween.

Conductor C is coupled to the collector of a constant-current transistor 242 of a constant-current source designated generally as 241 by way of serially coupled resistors 243 and 244. The voltage at the junction of resistors 243 and 244 is coupled to conductor K by an emitter follower transistor 245. The voltage at the junction of resistor 243 and collector of transistor 242 is coupled to a conductor H by an emitter follower transistor 246.

Conductors H and K are connected through current summing resistors 252 and 251, respectively, to the emitter of a transistor 253. The base of transistor 253 is connected to conductor J. A sum current output is taken from the collector of transistor 253 on a conductor D.

The current on conductor D is coupled through an emitter-coupled transistor type attenuator designated generally as 271 to a current mirror designated generally as 273 and appears on conductor E. The relative attenuation of circuit 271 is controlled by a resistor 272.

Conductor E is coupled to the base of a transistor 281 of comparator 280 and supplies sum current thereto. The base of transistor 281 also receives current from the emitter of a transistor 267 through a resistor 268. The base of transistor 267 is coupled to the center voltage on conductor J. The DC offset at the base of transistor 281 is controlled by the conduction of a transistor 277 having its collector connected to the base of transistor 281 and its emitter connected to ground. Transistor 277 is connected as a mirror by a diode 276 coupled across its base-emitter junction. The current of transistor 277 is controlled by a resistor 275 and the positioning of the tap of a potentiometer 274 connected between B+ and ground.

Ramp-on-pedestal generator 290 includes a charging capacitor 291 connected in series with a current source 292 between B+ and ground. The collector-to-emitter conduction path of a transistor 297 is coupled in parallel with capacitor 291. A resistor 299 is coupled across the base-emitter path of transistor 297 and is driven by the emitter of a transistor 296. The collector of transistor 296 is connected to the collector of transistor 297, and a resistor 298 is coupled across its base-emitter path. The base of transistor 296 is driven by the emitter of a transistor 295, the collector of which is also coupled to the collector of transistor 297. The base of transistor 295 is coupled to B+ by a resistor 227. The base of transistor 295 is also connected to the collector of a transistor 226, the base-emitter junction of which is coupled across resistor 222.

Charging capacitor 291 is coupled to the second input of comparator 280 by way of an emitter follower consisting of a transistor 293 and resistor 294 coupled to conductor F. Conductor F is coupled to the base of a transistor 282 which is emitter-coupled to transistor 281. Operating current is supplied to the joined emitters of transistors 281 and 282 during horizontal retrace intervals from the collector of a transistor 284, the base-emitter junction of which is coupled across resistor 221.

The output of comparator 280 is taken from the collector of transistor 282 by an inverting power amplifier designated generally as 283 which is coupled by a conductor G to the gate of SCR 44.

Figure 3A:
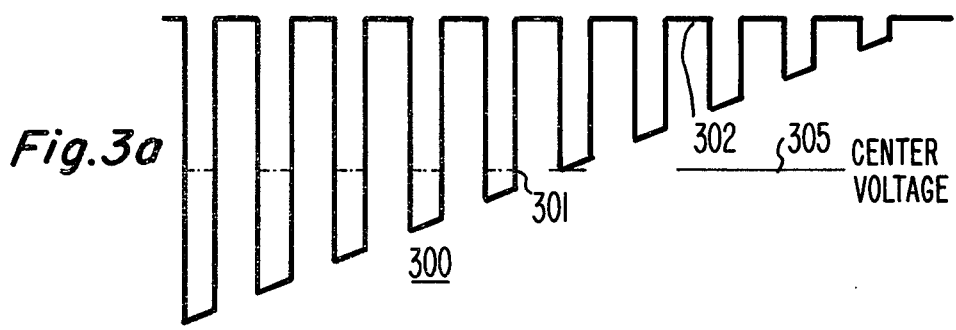
FIGS. 3a–3g illustrate amplitude-time waveforms occurring in the arrangement of FIG. 2 during operation.
Figure 3B:
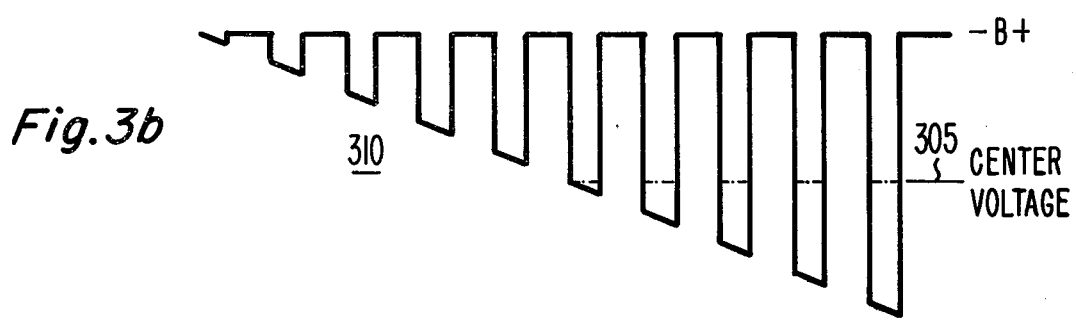
Figure 3C:
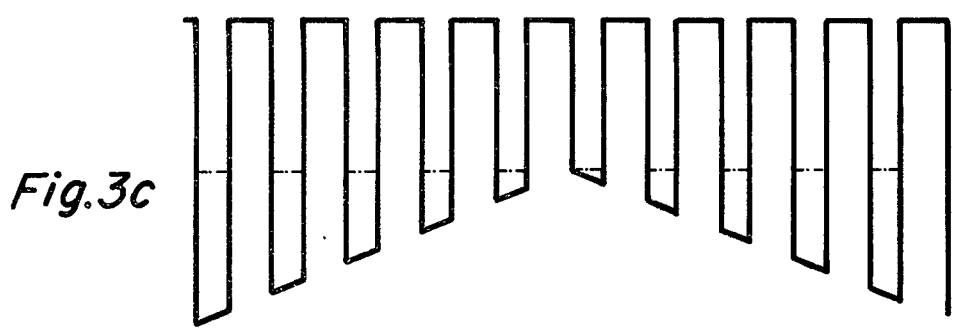

In operation, mutually inverted vertical-rate ramp voltages chopped at the horizontal rate appear on conductors A and B, as mentioned. In FIG. 3a, negative-going portion 301 of waveform 300 represents the horizontal retrace interval voltage on conductor A and 302 represents the horizontal trace interval voltage, which is B+. During the negative-going horizontal retrace interval portions of the waveform on conductors A and B, either rectifier transistor 235 or 236 will conduct, placing a voltage on conductor C equal to the more negative of waveforms 300 or 310, as shown in FIG. 3c and as described in U.S. Pat. No. 3,371,160 issued on Feb. 27, 1968 to W. Hurford. At the same time, center voltage generator 260 produces a voltage on conductor J during each horizontal retrace interval equal to the midpoint between the voltages on conductors A and B, as shown by 305 in FIGS. 3a and 3b.

The base voltage of transistor 242 of offset generator 240 is fixed by a voltage divider, and the collector voltage can go no higher or more positive than its saturation voltage. Consequently, during the horizontal trace intervals when the voltage at conductors A and B rises to B+, the voltage on conductor C can rise only to the saturation voltage 311 of transistor 242 as illustrated in FIG. 3c. Transistor 242 will remain saturated during the retrace interval so long as the difference between the voltage on conductor C and the saturation voltage on transistor 242 is insufficient to cause a current in resistors 243 and 244 which will satisfy the collector demand of transistor 242. When the demand is satisfied, transistor 242 operates in a linear mode and produces a constant current through resistor 243 which causes the voltage on conductor H to be offset by a fixed amount from the voltage on conductor K.

Figure 3D:
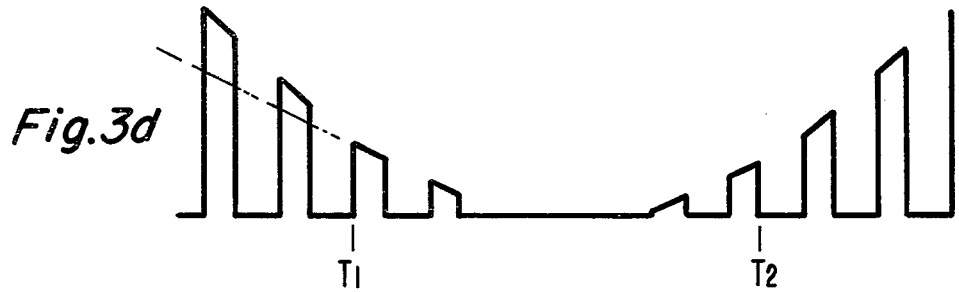

At the beginning and at the end of the vertical scanning interval, when the voltages at conductors H and K are at their lowest values and are below the center voltage on conductor J, both resistors 251 and 252 supply current to the emitter of summing transistor 253. Towards the center of the vertical scanning interval, however, the voltage on conductor H will rise above the center voltage, and instead of supplying current to the emitter of transistor 253, resistor 252 subtracts from the current supplied to the emitter by resistor 251. This results in a change in the slope of the current-amplitude versus time on conductor D, as shown in FIG. 3d near times T1 and T2. Still nearer the center of the vertical scanning interval, the voltage on conductor K also rises above the center voltage, and transistor 253 ceases to conduct. The current on conductor D is replicated on conductor E as proportioned by attenuator 271.

It should be understood that the sharp break points on the slopes of the waveforms are idealized for ease in understanding. The waveforms as seen on an oscilloscope will have more gradual transitions between the slopes at times T1 and T2, resulting from changes in emitter impedance of current summing transistor 253 and emitter followers 245 and 246 with changes in current. Thus, the envelope of the waveform of FIG. 3d approximates a vertical-rate parabola.

Figure 3E:
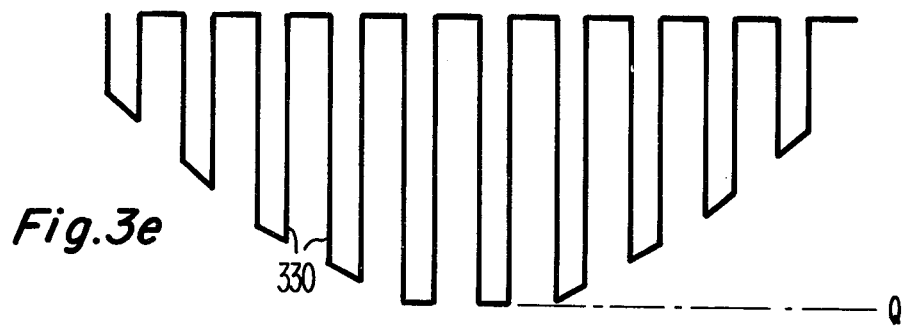

The voltage at the base of transistor 281 of comparator 280 is set by the center voltage on conductor J as modified by the base-emitter offset voltage of transistor 267 and the current flow in resistor 268, which is set by the conductivity of transistor 277. Current flow on conductor E bypasses some of the collector current of transistor 277 away from resistor 268, causing the horizontal retrace interval voltage at the base of transistor 281 to rise above the quiescent level Q as shown in FIG. 3e. During horizontal trace intervals, the center voltage rises toward B+ and raises the voltage on conductor E, as shown.

Figure 3F:
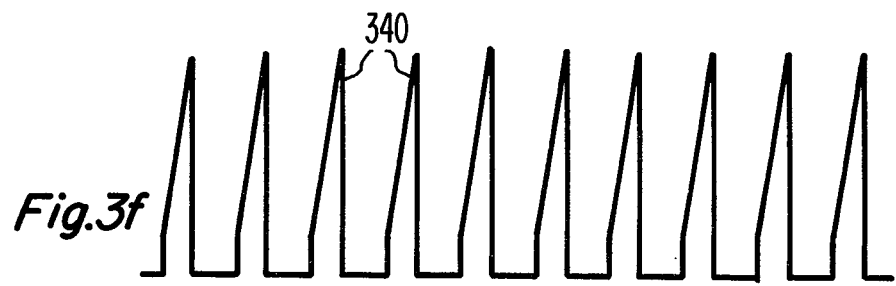

During the horizontal trace interval, no current flows in resistor 222 and transistor 226 is OFF. In this condition, transistor 295 is saturated, and the collector voltage of transistor 297 is at 2 Vbe. During the retrace pulse interval, transistor 226 becomes conductive and transistors 295 through 297 are turned OFF. Capacitor 291 begins to charge from the 2 Vbe level, and the resulting recurrent ramp 340 as shown in FIG. 3f is coupled on conductor F with an offset of 1 Vbe to the other input of comparator 280.

Comparator 280 is maintained nonconductive during the horizontal trace interval due to nonconduction of transistor 284. During each horizontal retrace interval, comparator 280 compares the ramp-on-pedestal on conductor F with the amplitude-modulated signal at conductor E and produces on conductor G a sequence 350 of gating pulses 352 modulated in duration as shown in FIG. 3g.

Figure 3G:

As can be seen in FIG. 3g, gating pulses 352 of sequence 350 each terminate at the end of the horizontal retrace interval. The leading edges, determined by the intersection of ramp-on-pedestal pulses 340 with pulses 330, occur just before the end of the retrace interval at the beginning and end of the vertical scanning interval, represented by the left and right hand end of sequence 350. This will result in gating of the pincushion switch late in the retrace interval, and cause reduced deflection current at the top and bottom of the vertical scan. Near the center of the vertical scanning interval, the intersection of waveforms 330 and 340 occurs earlier, and gating pulses 352 have leading edges which occur earlier in time to provide relatively increased deflection current towards the center of the vertical scanning interval.

Other embodiments of the invention will be obvious to those skilled in the art. For example, horizontal retrace pulses may be arranged to modulate only ramp-on-pedestal generator 290, and amplifier 210, rectifiers 230 and offset generator 240 may be operated unmodulated by the horizontal pulses. Offset generator 240 may be arranged to provide more than two outputs, and the additional outputs may be weighted individually in summing circuit 250.

In a particular application, the following values were found to give satisfactory operation:

| | |
|---|---|
| Operating voltage B+ | 6.3 volts |
| Resistors | |
| 213,214 | 12K |

-continued

| Operating voltage B+ Resistors | 6.3 volts |
|---|---|
| 215,216 | 1K |
| 217 | 1600 |
| 221 | 750 |
| 222 | 360 |
| 227 | 50K |
| 233,234 | 24K |
| 243 | 750 |
| 244 | 250 |
| 251 | 2K |
| 252 | 680 |
| 263,264,298,299 | 10K |
| 265,266,268 | 3K |
| 272,274 | 100K, 5K MIN |
| 275 | 15K |
| Current source 292 | 72 µA, variable |
| Capacitor 291 | 680 picofarads |

What is claimed is:

1. A pulse-duration modulated gating signal generator for use in conjunction with a television device including vertical and horizontal deflection rates, comprising:
   a ramp signal source of vertical rate ramp signal;
   inverting means coupled to said source of vertical rate ramp signal for generating an inverted vertical rate ramp signal;
   comparison means coupled to said ramp signal source and to said inverting means for passing the instantaneously larger of said ramp and inverted ramp signals;
   offset signal generating means coupled to an output of said comparison means for generating at a first plurality of outputs a like plurality of signals each offset from the other by a fixed amount;
   signal summing means coupled to said plurality of outputs of said offset signal generating means for forming a modified vertical rate ramp signal;
   comparator means including a first input coupled to said signal summing means;
   a source of horizontal rate signals;
   ramp-generating means responsive to said source of horizontal rate signals for generating ramp-shaped horizontal rate signals; and
   means coupling said ramp-shaped horizontal rate signals to a second input of said comparator means for forming at an output thereof a horizontal rate pulse which is duration-modulated by said modified vertical rate ramp signal.

2. A pulse-duration modulated gating generator according to claim 1 wherein said inverting means comprises differential amplifier means having a first input coupled to said ramp signal source and a second input coupled to a reference potential for producing said inverted ramp signal at a first output thereof and for coupling said ramp signal to a second output.

3. A pulse-duration modulated gating signal generator according to claim 2 wherein said comparison means is coupled to said first and second outputs of said differential amplifier means.

4. A pulse-duration modulated gating signal generator according to claim 1 wherein said comparison means comprises first and second semiconductor junctions, first like polarity electrodes of said first and second semiconductor junctions being coupled together at an output of said comparison means the second like polarity electrodes being coupled to said ramp signal source and said inverting means, respectively.

5. A pulse-duration modulated gating signal generator according to claim 4 wherein said first and second semiconductor junctions are the base-emitter junctions of first and second emitter followers, respectively.

6. A pulse-duration modulated gating signal generator according to claim 1 wherein said offset signal generating means comprises constant current source means; voltage divider means serially coupled with said constant current source means and including an input terminal coupled to an output of said comparison means and further including means coupling said plurality of outputs to points along said voltage divider for generating a like plurality of signals related by fixed offsets at said plurality of outputs.

7. A pulse-duration modulated gating signal generator according to claim 6 wherein said constant current source comprises a current mirror coupled to a source of supply and controlled by resistance means coupled to an input of said current mirror, and said voltage divider means comprises a plurality of serially coupled resistors.

8. A pulse-duration modulated gating signal generator according to claim 1 wherein said current summing means comprises said first plurality of voltage-to-current converter means each coupled to one of said first plurality of outputs of said offset signal generating means, and all coupled at a current summing point for forming a modified vertical rate current ramp signal.

9. A pulse-duration modulated gating signal generator according to claim 8 wherein each of said voltage-to-current converter comprises resistance means and said first plurality of outputs and said current summing point are low-impedance points.

10. A pulse-duration modulated gating signal generator according to claim 1 wherein said comparator means comprises an emitter coupled differential amplifier having a collector at which said duration-modulated gating signal is formed.

11. A pulse-duration modulated gating signal generator according to claim 10 wherein said ramp generating means is coupled to an output of said horizontal rate signals for being synchronized with the horizontal retrace pulses.

12. A pulse-duration modulated gating signal generator according to claim 1 wherein said first plurality is two; and said modified vertical rate ramp signal approximates a vertical-rate parabola.

13. A pulse-duration modulated gating signal generator according to claim 12 wherein said horizontal rate pulses are duration modulated by said approximate vertical-rate parabola.

* * * * *